(12) United States Patent
Rubin et al.

(10) Patent No.: US 6,601,772 B1
(45) Date of Patent: Aug. 5, 2003

(54) COMPACT MATRIX CODE AND ONE-TOUCH DEVICE AND METHOD FOR CODE READING

(75) Inventors: Kim T. Rubin, Menlo Park, CA (US); Keith Blei, Oakland, CA (US); John R. Haggis, San Jose, CA (US)

(73) Assignee: IntelliDOT Corporation, Wilmington, DE (US)

( * ) Notice: Subject to any disclaimer, the term of this patent is extended or adjusted under 35 U.S.C. 154(b) by 159 days.

(21) Appl. No.: 09/616,265

(22) Filed: Jul. 14, 2000

(51) Int. Cl.⁷ .............................................. G06K 19/06
(52) U.S. Cl. .................. 235/494; 235/472.01; 235/487; 235/456; 235/38; 235/462
(58) Field of Search ................................ 235/494, 454, 235/456, 462.02, 375, 462.01, 380, 487, 472.01

(56) References Cited

U.S. PATENT DOCUMENTS

| | | | |
|---|---|---|---|
| 4,857,715 A | 8/1989 | Koch et al. | |
| 4,874,936 A | 10/1989 | Chandler et al. | |

(List continued on next page.)

FOREIGN PATENT DOCUMENTS

| | | | |
|---|---|---|---|
| EP | 0 336 769 A2 | 10/1989 | |
| EP | 0 336 769 B1 | 1/1995 | |
| EP | 0 672 994 A1 | 9/1995 | |
| EP | 0 785 526 A2 | 7/1997 | |

OTHER PUBLICATIONS

Internet Article from *The AIM Global Network*, entitled: Matrix Bar Code Symbologies, two pages, Jun. 5, 2000, [http://www.aimi.org/aimstore/matrixsymbologies,htm].

Internet Article from *MaxiCode Briefing Document*, four pages, Jun. 7, 2000, [http://www.maxicode.com/doc_brif-.htm].

Internet Article by Longacre, Jr., Andrew "Emerging Barcode Symbologies," *Hand Held Products, Welch Allyn affiliate*, seven pages, Jun. 6, 2000, [http://www.dcd.welchallyn-.com/techover/2dsymbol.htm].

Internet Article by Longacre, Jr., Andrew "A Current Look at Barcode Symbologies," *Hand Held Products, WelchAllyn affiliate*, four pages, Jun. 6, 2000, [http://www.dcd.welchal-lyn.com/techover/current.htm].

*Primary Examiner*—Thien M. Le
*Assistant Examiner*—Allyson Sanders
(74) *Attorney, Agent, or Firm*—Parsons Hsue & de Runtz LLP

(57) ABSTRACT

A two-dimensional matrix code, method of producing the code and a method and device for reading the code are presented. The code is a round, compact and distinct code that stores an error-corrected 64-bit number, embedded targets, and quality control information within a space small enough for imaging using a compact, hand-held code finder. The code incorporates white space both between the data areas and targets for easy identification of the code and to aid in image processing, and within the data area to correct for errors that sometimes occur when printing using low-quality techniques. Additionally, the code includes features to correct for other printing errors, such as variations in printing press speed and intentional aspect ratio stretching to fill copy space. The code is thus robust enough to be incorporated within newsprint and is also easily imaged using specially constructed code finders. A code finder device and a method of using the finder for acquiring a code of the present invention is also presented. The finder is portable and easy to use, requiring no rotational orientation for correct acquisition. Several embodiments are described, in which the finder contains illumination and communications electronics and means to notify the user of correct operation of the finder.

89 Claims, 5 Drawing Sheets

U.S. PATENT DOCUMENTS

| | | | |
|---|---|---|---|
| 4,998,010 A | * 3/1991 | Chandler et al. | 235/494 |
| 5,091,966 A | 2/1992 | Bloomberg et al. | |
| 5,189,292 A | * 2/1993 | Batterman et al. | 235/494 |
| 5,202,552 A | 4/1993 | Little et al. | |
| 5,245,165 A | 9/1993 | Zhang | |
| 5,363,021 A | * 11/1994 | MacDonald | 250/396 R |
| 5,412,771 A | 5/1995 | Fenwick | |
| 5,487,115 A | 1/1996 | Surka | |
| 5,515,447 A | 5/1996 | Zheng et al. | |
| 5,521,372 A | 5/1996 | Hecht et al. | |
| 5,552,593 A | * 9/1996 | Biss | 235/494 |
| 5,591,956 A | 1/1997 | Longacre, Jr. et al. | |
| 5,612,524 A | 3/1997 | Sant' Anselmo et al. | |
| 5,684,885 A | 11/1997 | Cass et al. | |
| 5,748,804 A | 5/1998 | Surka | |
| 5,790,126 A | 8/1998 | Ballard et al. | |
| 5,867,173 A | 2/1999 | Ballard et al. | |
| 5,926,189 A | 7/1999 | Beaman et al. | |
| 6,092,732 A | * 7/2000 | Curry | 235/460 |
| 6,182,901 B1 | * 2/2001 | Hecht et al. | 235/487 |
| 6,298,171 B1 | * 10/2001 | Lorton et al. | 235/494 |
| 6,327,395 B1 | * 12/2001 | Hecht et al. | 235/456 |
| 6,330,976 B1 | * 12/2001 | Dymetman et al. | 235/487 |

* cited by examiner

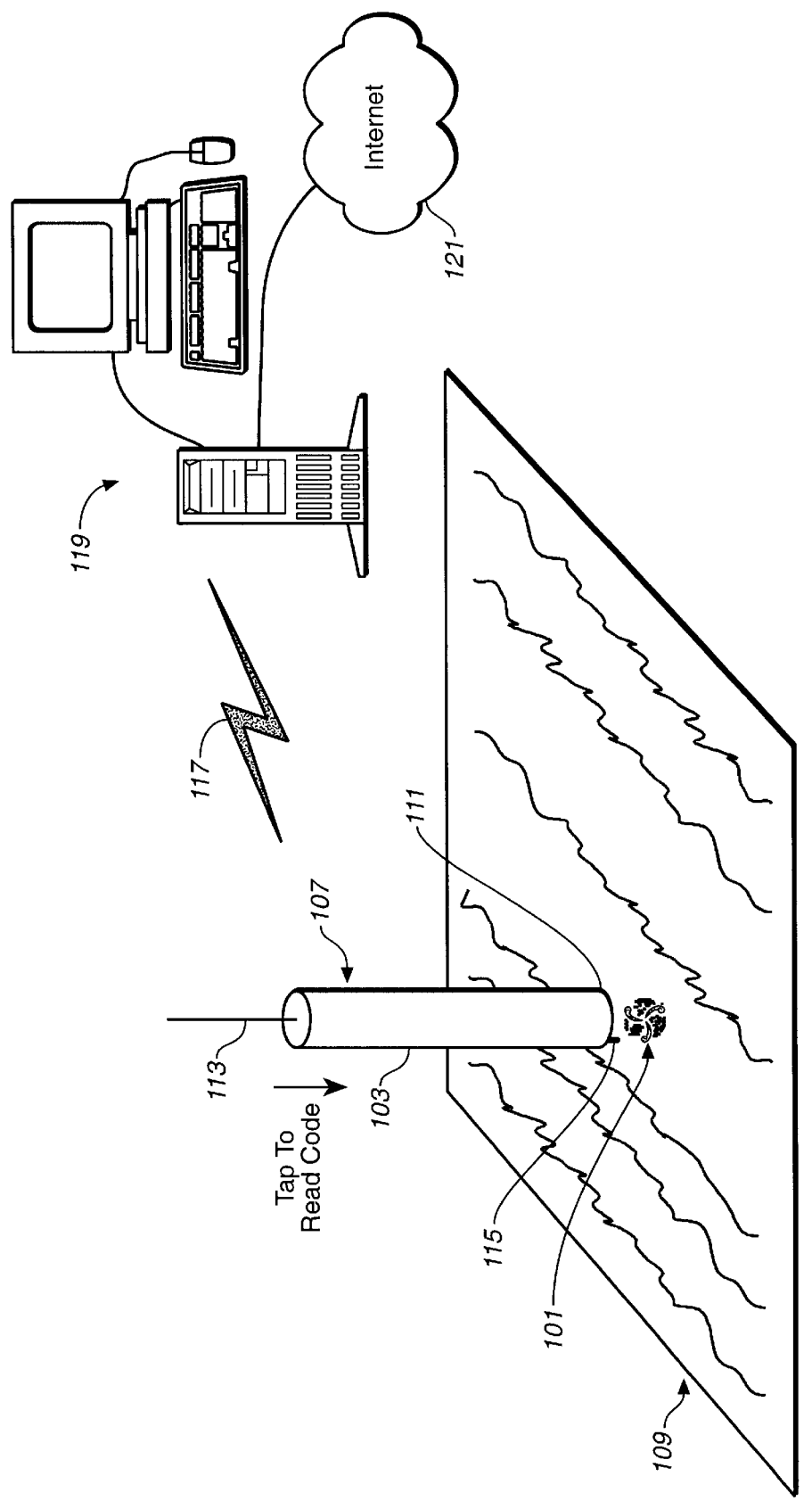
FIG._1

FIG._2
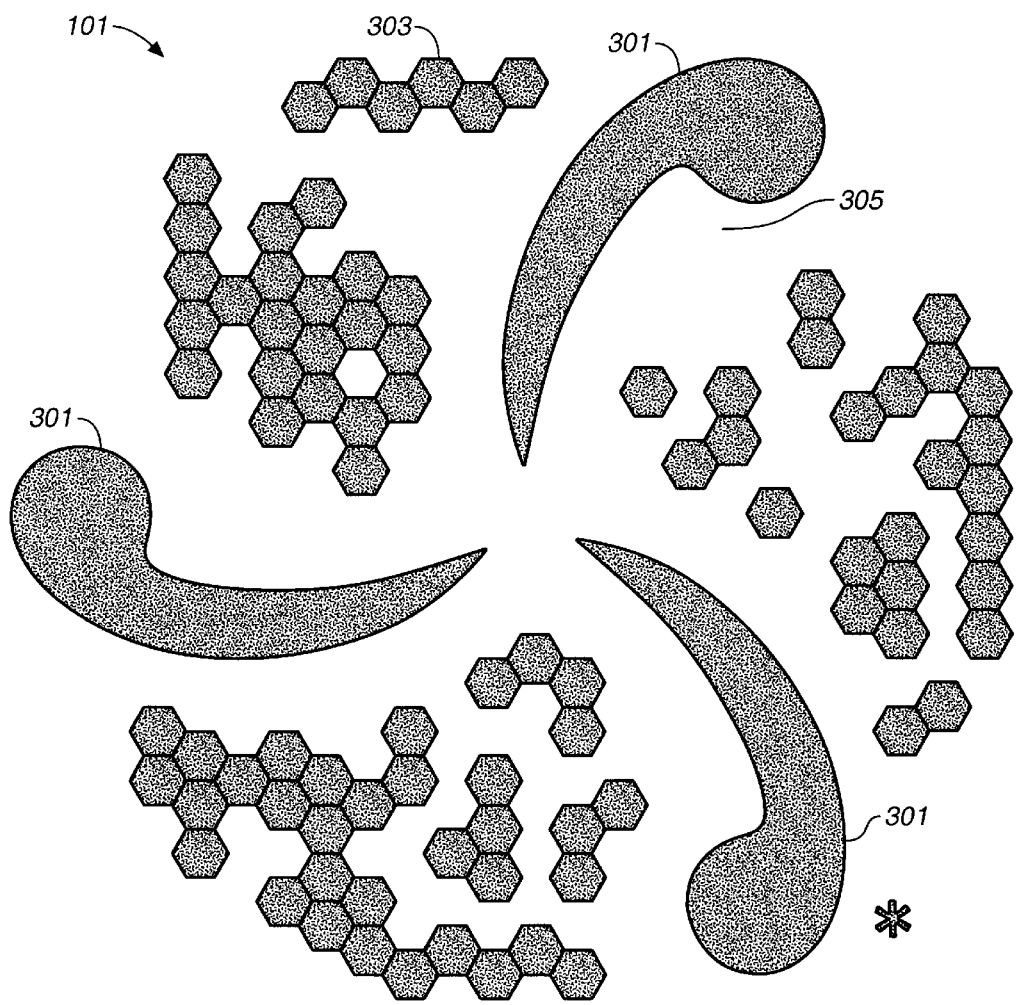
FIG._3

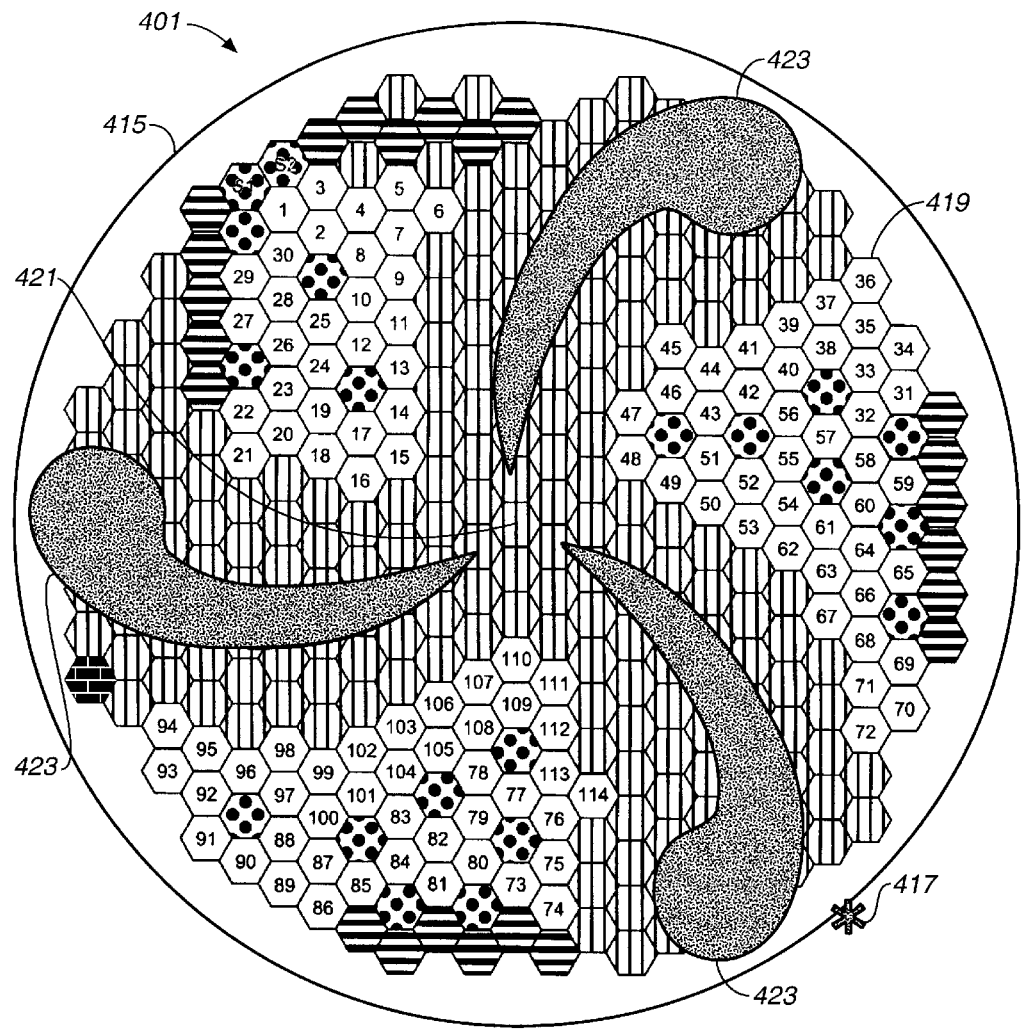
FIG._4

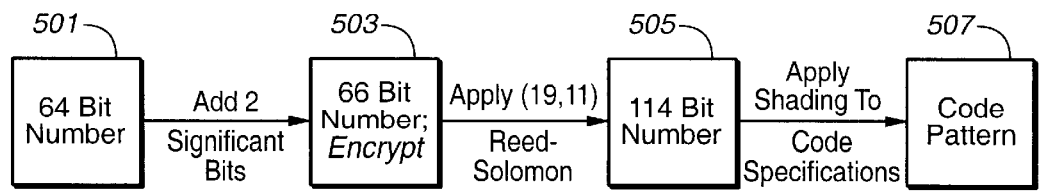
FIG._5
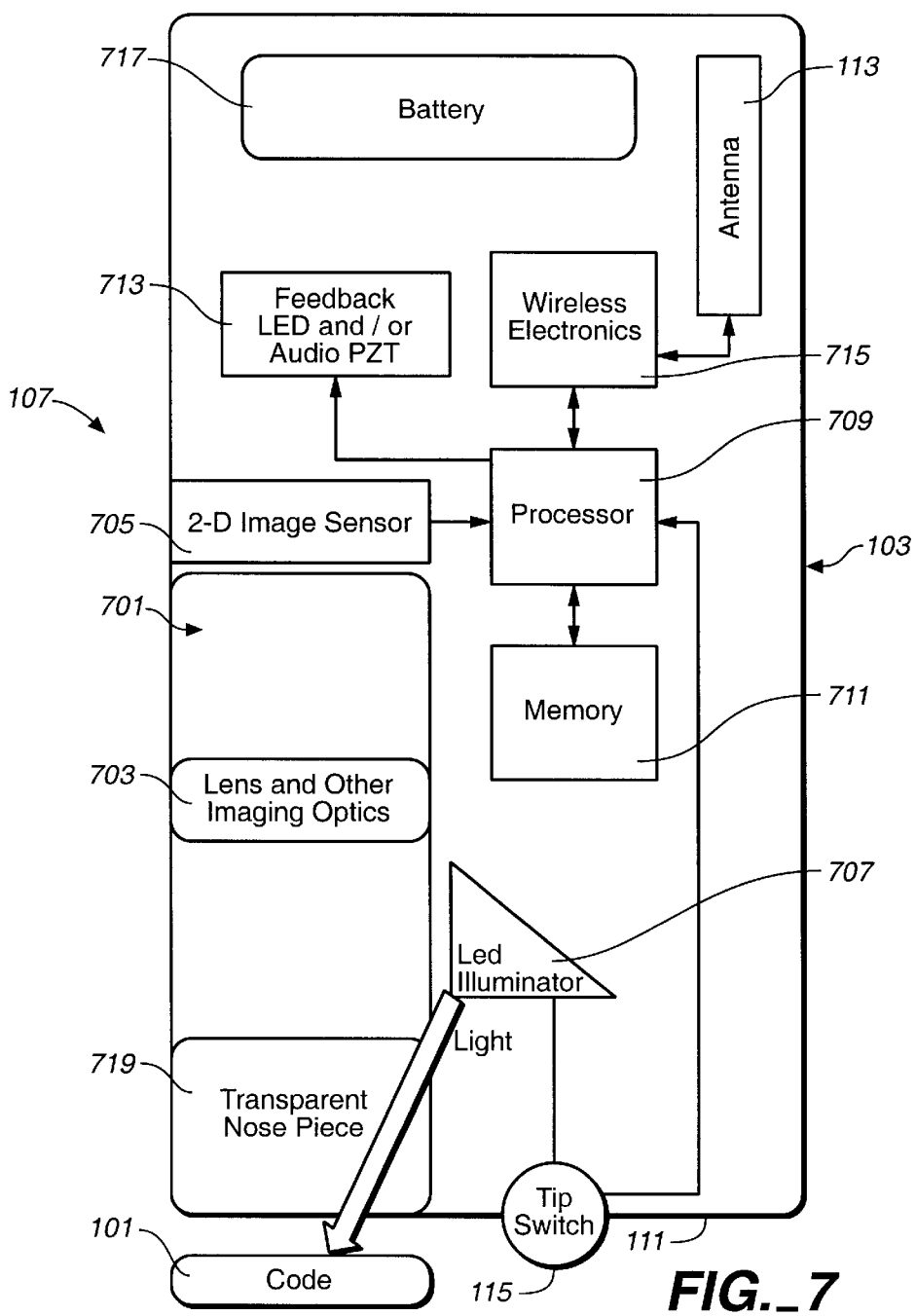
FIG._7

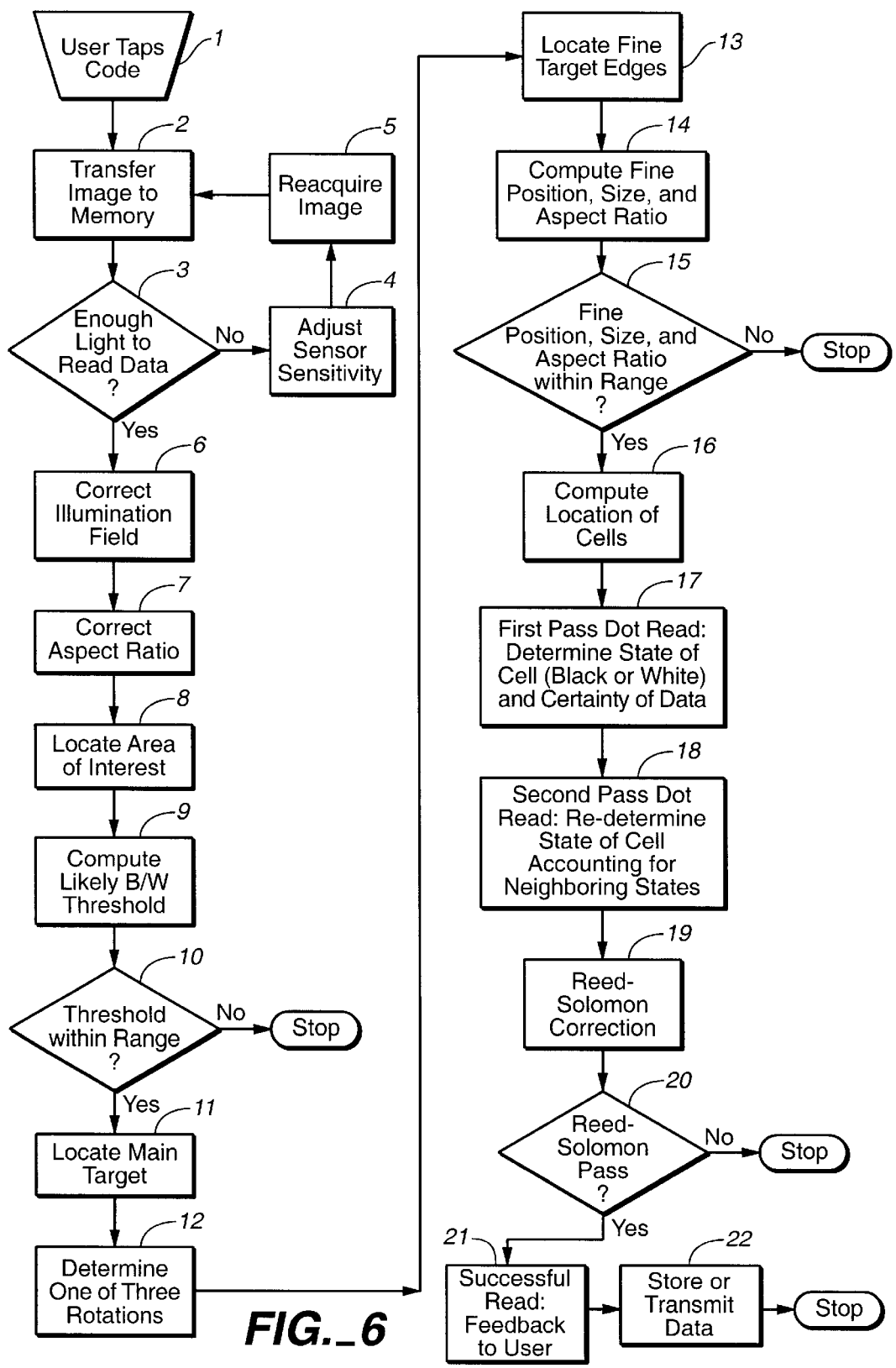
FIG._6

COMPACT MATRIX CODE AND ONE-TOUCH DEVICE AND METHOD FOR CODE READING

FIELD OF THE INVENTION

The present invention is related to the field of optically encoding information. More specifically, the present invention is directed to a two-dimensional matrix code, a method for using the code, and a device for reading the code.

BACKGROUND OF THE INVENTION

Machine readable codes, generically known as "bar codes," have been developed to allow coded objects to be tracked, controlled or manipulated. Commonly used codes store information according to variations of optical properties, and are "read" using optical devices that either scan or image the code. Increased computing and automation capacity has made it possible to incorporate bar code technology into a wide variety of commercial and industrial applications. Early applications included the automating of retail sales and inventory control, the tracking individual items through mail systems, and automating of manufacturing activities. Recent changes in business practices have combined the integration of warehouse management, order filling, shipping and delivery, along with computer-based ordering, to provide for rapid turn around of consumer orders of everything from books to groceries. Thus bar code technologies which at first aided standard services are now enabling new and faster methods of providing services, which in turn spurs the development of new technologies to fulfill even more requirements of object identification.

Optical bar codes store information according to spatial variations of surface optical properties, including but not limited to reflectivity, color, and absorption. Bar codes are usually imparted onto surfaces through a printing process which results in a pattern having the required spatial optical property variation. The information density is ultimately limited by the resolution of the printing process, which may include such factors as how the minimum line width or dot resolution depend on how the ink is transferred and dries on the surface, and the ability to correct for errors due to surface or ink inconsistencies. Aspects of bar codes technology which need be considered include the physical layout of information within the code, optical and software demands for reading the code and printing requirements that will aid in producing a readable bar code. Due to the wide variety of applications, bar codes have been developed to contain varying amounts of information and to be compatible with differing printing and reading requirements. Many codes have been developed to be used under varying conditions, and thus are optimized to produce reliable, nearly error-free machine reading under limited conditions.

Most bar codes can be categorized as being either one-dimensional, stacked, or matrix codes according to how the information is stored, although some codes combine elements from more than one of these categories, while others use half-tones, colors or other techniques to increase the information density and improve reliability. One-dimensional codes usually store information according to variations in the width of printed bars, which can be arranged in many configurations. One-dimensional codes lend themselves to reading by scanning, in which the code and an optical reader are moved relative to one another in a preferred direction. During scanning, temporal variations of reflected light is detected which is then used to determine variations of code bar widths. Linear one-dimensional bar codes consist of bars of varying width and spacing arranged in a rectangular space. Other one-dimensional codes have been developed which encode data in concentric circular rings and as radial spokes in a circular pattern. While one-dimensional codes can be robust, allowing for printing and reading on a wide variety of materials, the information density is usually low and there is a limited range of scanning directions and speeds that allow for accurate reading of the code. To account for scan speed, these codes usually incorporate clocking signals within the bar code to determining scan speed as well as code content.

Stacked or multi-row codes are essentially multiple, one-dimensional codes arranged adjacent to each other. These codes have increased information density at the expense of greater scanning complexity. Stacked codes are usually rectangular and have the appearance of having a preferred scanning direction, as with a one-dimensional code, but also have information encoded in a direction perpendicular to the preferred direction. They can be read either by scanning systems that sweep perpendicular to the scanning direction or with imaging systems. While stacked codes have greater information density than one-dimensional codes, scanned codes have the same user problems with regards to scanning as one-dimensional codes, and may also incorporate clocking signals within. While imaging has the advantages inherent in acquiring the entire code at once and thus may be independent of the code position, interpreting the code content of the image depends on the orientation of the code relative to the imaging optics, uniformity of lighting, and other properties which must be determined or accounted for. In addition, imaging such code can be problem, as the codes are frequently affixed to goods that are moving, and thus the imaging system must accommodate variations in position, orientation and speed while providing the resolution required to read the code.

Matrix codes arrange information over a two-dimensional area, usually over a regular square or hexagonal grid. Common features of matrix codes are data cells arranged in a predetermined grid or array and targets for code recognition and orientation. Reading of matrix codes is accomplished with imaging optics which take in the entire code at once. Many applications involve reading of moving codes had thus have many of the problems discussed in the previous paragraph. Determining the location, orientation and optical properties of each data cell can be achieved with these codes under limited, often controlled setting. In addition, several codes require the use of special labels to achieve a required level of robustness.

SUMMARY

Although bar code technology has been developed to meet a variety of needs, prior art bar codes are still difficult to read, requiring expensive and sometimes hard-to-use equipment. Scanning requires the user to maintain an orientation and speed which can be difficult for even trained personnel, while imaging require expensive optics for code reading. The widespread acceptance and availability of computers and computer networks provides an opportunity for consumers to use bar codes as a computer interface, if a reliable, easy to use bar code system were available. Thus there is a need for code that is optimized to store information for computers at high densities on common materials, and is easily recognizable by a consumer. Specifically what is needed is an optically readable, two-dimensional matrix optical matrix code that can be printed using standard printing technologies, in any orientation to other adjacent printed matter, and which can be acquired easily, robustly and positively in one action by a user. Also, the code should not have a perceived rotational orientation and is should be capable of being read without regard to rotational orientation, resulting in a code with which users do not waste time trying to determine the proper way to acquire the code. Additionally, reading of prior art codes is problematic, requiring either expensive imaging hardware or touchy hand held scanners. A device and method of reading a code is also needed that is both easy to use and inexpensive hand-held imaging device for reading matrix codes.

One aspect of the present invention is to provide matrix code and method of using the code that is both compact and is easily distinguishable among print media. One embodiment stores data in a hexagonal grid having a target structure embedded within. A portion of the target structure has predominant radial features extending from the code periphery towards the center and surrounded by white space, resulting in a symbol having easily recognizable shape, thus allowing consumers to identify the brand of code. It is another aspect of the present invention to provide a matrix code having data and targets contained within a circular or slightly elliptical area that includes white space surrounding the target to make the code visually distinct.

It is another aspect of the present invention to provide a matrix code that can be incorporated into common materials such as newsprint. Several aspects of the present invention allow for improved reliability at high data densities using printing techniques that are compatible with standard printing practices. In one aspect, targets for fine positioning are incorporated into the code and essentially surround the data. In another aspect, the layout of data cells is chosen to provide the greatest benefit from error correction schemes. In yet another aspect of the present invention, white space is incorporated within the code to reduce errors resulting from ink bleed, such that no data cell is surrounded completely either by other data cells or other space that is black. Another aspect provides a method for encoding a number using an error correction scheme into a second number, which is encoded through the printing within data cell areas. One embodiment incorporates (19,11) Reed-Solomon error correction algorithms. In another embodiment encryption is used to protect the encoded information. In another aspect of the present invention a matrix code is provided with reserved white space among data cells.

Another aspect of the present invention is to provide a matrix code that facilitates consumer use by not having a preferred orientation for reading. A target is embedded within the data areas of the code and is surrounded by reserved white space to make both the target and code distinct. In one aspect, the target is both radial and curved, presenting an image that is roughly circular with no preferred rotational orientation. In one embodiment, the code is less than one centimeter across, allowing contact reading using a finder of the present invention.

Yet another aspect of the present invention is to present a matrix code and method in which data is segmented into noncontiguous areas separated by the radial target features.

Another aspect of the present invention is to provide a matrix code that can be read with printing or reading errors of up to 15% in any direction.

It is another aspect of the invention to incorporate quality control areas within a matrix code for determining the print and reading quality of the code.

In addition, several aspects provide methods for producing matrix codes of the present invention.

It is another aspect of the present invention to provide a finder for reading codes. In one embodiment the finder includes a contact switch for initiating the reading process, optics and sensors for obtaining a digital image of the code, a computer for performing image processing and reading of the code, memory for storing codes, and wireless communications for transmitting codes to external devices.

In another aspect of the present invention, a method of using a finder in the reading of codes is provided. In one embodiment, acquisition of the code is provided with a finder that then transmits the code.

Another aspect of the present invention provides for a finder that can receive signals for modifying finder operation or memory content.

It is an aspect of the finder an method of using same to allow for code acquisition without regard to rotational orientation.

Yet another aspect of the present invention is to provide a finder that is inexpensive and easy to manufacture.

Another aspect of the present invention is to provide a finder that is portable. In one embodiment, the finder is incorporated into other electronic or non-electronic devices for accessibility of the finder.

Another aspect of the present invention is to provide a finder for acquiring codes that is easy to use.

A further understanding of the invention can be had from the detailed discussion of specific embodiments below. For purposes of clarity, this discussion refers to devices, methods, and concepts in terms of specific examples. However, the method of the present invention may operate with a wide variety of types of devices. It is therefore intended that the invention not be limited by the discussion of specific embodiments.

For purposes of clarity, the invention is described in terms of systems that include many different innovative components and innovative combinations of components. No inference should be taken to limit the invention based on any illustrative embodiment of this specification.

All publications and patents cited herein are hereby incorporated by reference in their entirety for all purposes. Additional objects, advantages, aspects and features of the present invention will become apparent from the description of preferred embodiments, set forth below, which should be taken in conjunction with the accompanying drawings, a brief description of which follows.

BRIEF DESCRIPTION OF THE DRAWINGS

The invention will be better understood by reference to the Figures of the drawings wherein:

FIG. 1 is a schematic of the use the present invention for retrieving information from a printed page, including one embodiment of the code and of the finder of the present invention;

FIG. 2 illustrates a matrix code of the present invention as incorporated into an advertisement;

FIG. 3 is an enlarged detail of the matrix code of the present invention as printed;

FIG. 4 is a specification of the assignment of space and optical properties for one embodiment of the matrix code;

FIG. 5 is a flow chart illustrating one method for encoding a 64-bit number into a 114-bit code according to the present invention;

FIG. 6 is a flow chart illustrating one method for decoding a two-dimensional code of the present invention; and FIG. 7 is a schematic of a two-dimensional code finder according to one embodiment of the invention.

Reference symbols are used in the Figures to indicate certain components, aspects or features shown therein, with reference symbols common to more than one Figure indicating like components, aspects or features shown therein. The reference symbols used herein are not to be confused with any reference symbols used in the items that have been incorporated herein by reference.

DESCRIPTION OF SPECIFIC EMBODIMENTS

In order to facilitate description, the following discussion will describe the present invention in terms of specific embodiments of: matrix codes for storing machine readable information on a surface, methods for reading and writing said codes; and of imaging finders for reading matrix codes. It will be understood to those of skill in the art that many aspects of the present invention may be achieved using a matrix code having an appearance different from that described herein and by using methods, algorithms, and hardware that differ from those described in this specification. In addition, various aspects of the present invention can be achieved using different combinations of hardware and software, and that these components may be located within the finder or within an external device which the finder is in wireless or wired communication. The invention should therefore not be taken as limited except as provided in the attached claims.

Features and General Considerations

A matrix code of the present invention comprises a machine readable, two-dimensional code for the storing of information on the surface of a media. In one embodiment, the code is an optical code having two or more of optical properties. Within the code are data cells arranged on a grid that are used for storing information according to their individual optical properties, targets at predetermined positions relative to the data cells for code recognition, and quality control cells used for determining printing and reading quality. Importantly, the code also includes reserved space having predetermined positions and recognizable optical properties that contrast with the target. In much of the discussion that follows the target is printed in a dark color or shade, and thus the reserved space is referred to as reserved white space. Some of the reserved white space surrounds a portion of the target, producing a distinctive code, and other white space is embedded within the data cells to allow for more reliable reading of printed codes. The code is intended to be read by an imaging system, or finder, that acquires the entire code at once and which then subsequently determines the location of data cells within the code independent of the any physical relative orientation between finder and code. The code of the present invention has no obvious rotational orientation, and thus does not present a user with the problem of aligning code and finder.

The code of the present invention includes data, positional and quality control information through variations of optical properties on a surface. The production of variations of optical properties which are machine readable can include many techniques that provide for printing the two or more optical properties within the code. "Printing," as used herein, refers to any process that directly or indirectly produces variations of optical properties on a surface that can be differentiated by a machine vision system If the surface has a distinct optical properties, printing may include the absence of modifying portions of the code area, thus using the optical properties of the surface as part of the code. A two optical property code could thus be printed with only one color of ink. If the surface is not well characterized, a two optical property code might be printed on a surface using two colors of ink. The optical properties to be varied include colors, shades, reflectivity, absorption, scattering or any property that can be determined by analysis of the light which is reflected off of the surface. Two optical property codes commonly use black ink transferred onto a characterized surface. Techniques for printing include ink printing, thermal printing, dye transfer, laser printing and most techniques used for producing readable copy, and may include incorporating the code into other printed matter or producing a special label for the code.

FIG. 1 is a schematic of the use the present invention for retrieving information from a printed page, including one embodiment of the code and of the finder of the present invention, with the finder being placed in position to read the code. Details involved in reading and decoding will be discussed subsequently in greater detail; this discussion is meant only to illustrate some possible uses for the present invention and not a limitation of the invention. One of the two-dimensional matrix codes or "dots" 101 of the present invention is shown on a surface 109. Surface 109 may have other printed matter, including text, pictures, additional codes 101 or other types of codes. Code 101 is distinctive and is recognizable as a code that, when read and transferred to an external device, allows for one or more of a number of actions to occur. The code of the present invention can have many applications. Thus surface 109 may be a page containing an advertisement, and acquiring code 101 retrieves, through a networked computer, more information regarding a product or service. Alternatively, surface 109 may be a business card, and acquiring code 101 causes contact information to be placed in a users database of business contacts.

Reading of the code is performed using a hand-held imaging reader or finder 107. Bringing finder 107 in proximity with code 101 causes imaging optics internal the finder to acquire a high resolution image of the code, detect the presence of and decode the image according to its optical properties, and transmit information to external devices. Finder 107 includes an elongated case 103 for holding the finder, a tip 111 through which code 101 is read, a tip switch 115 to indicate to the finder electronics that a code is to be read, and an antenna 113, which may alternatively be internal to case 103, for transmitting information to external devices. Reading of code 101 is initiated by a customer, consumer or user (not shown) grasping case 103 an bringing finder tip 111 perpendicularly towards code 101, activating switch 115. Code 101 is imaged by finder 107 when the code is at or near the position at which switch 115 is activated. Tip 111 is larger than code 101 and is designed to acquire the code irrespective of any rotational orientation between finder and code.

Activating finder 107 by switch 115 initiate a series of steps, discussed subsequently, necessary to read the code, including illuminating the code, imaging the code, and executing the image processing steps to extract information from the code and signaling to the user that the code has been acquired. If the code has not be successfully acquired, the finder will make multiple attempts to illuminate, image and decode. If the code can still not be acquired, then the user would tap the code again and restart the acquisition process.

After acquisition of the code, the information may be converted into a binary number or some other form of information on which the finder, devices connected to the finder either through wires or wireless communication, or any number of other external devices could act. Additionally, the ability to interpret the information may lie within the finder, within a local device, or may reside within a computer accessible over a network such as the Internet. Interpreting the information may include error-correction algorithms, data encryption, or the looking up one or a series of actions to perform as a result of having read the information.

Transmission of information from the finder to external devices may take place immediately after acquisition, or may be delayed until the user is near a device to which the information will be transferred. FIG. 1 shows one embodiment in which finder 107 communicates to computer 119 through a wireless connection 117, and in which the computer communicates the code and other information related to the code to other computers through a connection, such as internet 121. In an alternative embodiment, it may be desirable for finder 107 to be a wired computer peripheral, and possibly for the host computer to perform some or all of the calculations which have been previously described as being performed within the finder.

Matrix codes of the present invention include many features which allow them to be particularly useful in the context of consumer electronics and especially with networked computers. Some of the features are evident from the illustration of FIG. 2, in which a code 101 of the present invention is shown included within a printed advertisement 201. Code 101 has a distinctive look that is recognizable within printed matter. A consumer wanting more information on the product would tap code 101 using finder 107. There are many possible acts which might follow from tapping the code. Information from code 101 could, for example, be transmitted to the consumers computer, which would access a page on the Internet, or might enter the consumers name onto a mailing list for more information. Additional information which may be transmitted or stored include the time at which the code was acquired.

The size of code 101 is chosen to allow for the error-corrected storage of a 64-bit number in a size that can be imaged using a hand-held finder, such as finder 101. While the code of the present invention is presented as the relative position of components of the code, a useful approximate size for code 101 is that of a normal midsize fonts (for example, about 10 to 14 points). Unlike nearly all other codes, code 101 does not have any preferred rotational orientation. This is important since the appearance of the code provides a clue, perhaps subliminally, to the average user as to how to orient the finder with the code. If the code has the appearance of a linear bar code like that of the UPC system, then the user would likely run the finder along the code. Given such visual cues, the average user would attempt to orient the finder to the code, thus slowing the finding process or making the user unsure that they are using the system correctly, even though the finder can read the code in any orientation.

General Features of the Code

The matrix code embodiment described subsequently is illustrative and incorporates many separate advances which individually are within the scope of the present invention. Thus the matrix code embodiments discussed herein is not meant to limit the scope of the invention. The embodiment presented herein includes the following features, which taken together or individually are within the scope of and which achieve several aspects of the present invention. The code of the present invention stores data, positional and quality control information according to variations of shading on a surface. Data is stored according to the optical properties of individual data cells, which occupy predetermined locations within the code. Some of the space within the code has predetermined shading, locations and shapes in relation to the data cells, and the data cells have predetermined locations and shapes relative to the portions of the code that are not data cells.

FIG. 3 is an enlarged detail of the matrix code of the present invention as printed. Code 101 is a pattern of two optical properties which appears on FIG. 3 as a printed pattern ("black") on a background ("white"). One embodiment has the code printed using black ink on a light background having optical properties that are measurably different from the black ink. In general, the term black and white are used to denote two states in a general way, as describe previously. Code 101 includes three curved black targets 301 surrounded by reserved white space 305 and hexagonal cells 303 laid out on a close-packed hexagonal grid and storing data according to the location and optical properties of individual cells, additional targeting information and quality control information. Data is encoded according to the shading of some of cells 303, with FIG. 3 showing the code for arbitrarily, though representative, coded information.

FIG. 4 is a specification 401 of the assignment of space and optical properties for one embodiment of the matrix code 101. The position and color of previously described targets 301 are shown as coarse target 403. Other features of the code are arranged on a hexagonal, close-packed grid 419 including: multiple black fine targets 407; a plurality of hexagonal data cells 411 with individual cells numbered as shown and which may be either black or white; multiple reserved white space 405 that is embedded within the data cells; reserved white space 409 that separates the coarse targets from the data cells (shown as white space 305 in FIG. 3); and a quality control cell 413 that can is black, white, or possibly other colors and can be solid or patterned as described below. Code features 403 to 413 are contained within a circular perimeter 415. Additionally, a mark 417 may be provided either as an additional ornamental marking. As portions of code 101 may be purely ornamental, those parts may be trademarked, and mark 417 may be a trademark symbol such as ™ or ®.

Subsequent discussion of the components of code 101 will refer to the specification 401 of FIG. 4 with the understanding that the code as printed does not include grid 419, the numbers in data cells 411, or perimeter 415, and that the optical properties within individual cells is determined by the specification 401, the data that is encoded within data cells 411, and the optical properties of quality control cell 413.

Targets

Coarse targets 403 are surrounded by white space 409, resulting in distinct targets that are embedded within code 101. The purpose of targets 403 are to provide an indication of the brand of the code, provide initial targeting information for image processing to recognize the code, and locate the centroid of the code. The main features of each of the three targets 403 are: that they be distinct from the rest of code 101, a feature provided by surrounding white space 409; that they each have a feature 423 (the "head" of each of targets 403) that are easily recognized through image processing techniques; and that the centroid of the sum of the three recognizable features 423 coincide with a centroid 421 of perimeter 415. As an alternative embodiment, targets 403 could be white surrounded by a black reserved space. The arrangement of black and white in an around target 403 are chosen to present a curved target with radial symmetry that expends from at or near perimeter 415 towards centroid 421, and is thus embedded within code 101. The degree of radial symmetry should be equal or greater than 3 so that there is no perceived preferred orientation to code 101. The curved, radial shape of targets 403, along with other features contained with grid 419 results in a code that has a roughly circular appearance without a strong appearance of a preferred rotational orientation. Since the code is intended for use with an imaging system that can decode irrespective of physical rotational orientation relative to the code, this last aspect is an important feature that aids in the easy use of the code.

Fine target 407 is composed of four groupings of black hexagonal cells located at or near perimeter 415. The purpose of targets 407 is to present more finely calibrated positions for locating each of individual data cells 411 and alternatively for determining the rotational orientation of the code image. The four targets 407 provide information that can be used for scaling an image of the code in both dimensions, and through comparison with positions known in relation to the targets, determine the data cell corresponding to each pixel of the code image. The location of fine targets 407 along the periphery 415 provide for calibration across the entire code, and are useful in correcting for variations in printing that may otherwise be interpreted as errors. For example, variations in printing speed can change the aspect ratio of printed objects, and occasionally the aspect ratio is purposely modified to fill space. These and other variations of codes can result in reading errors. Locating fine targets 407 approximately external to data cells 411 allows for codes having a deviation of up to 15% in scaling in any direction to be read correctly. The roughly external placing of fine targets in the code of the present invention is in contrast with other codes, such as MaxiCode, which scale the image based on an internal target and thus introduce progressively higher positioning errors as the periphery of the code is approached.

Data Cells

Information is coded according the arrangement of optical properties of individual ones of the plurality of data cells 411. In one embodiment, each one of cell 411 corresponds to a binary digit of a binary number, and the one of two optical state within each cell corresponds to a binary "0" or "1." This arrangement maps the optical properties of each of the 114 data cells 411 in to a 114 digit binary number. Using this embodiment, the specified data cells 411 can store the amount of information equivalent to a 114-bit number. Alternate embodiments employ Reed-Solomon error correction schemes that group cells 411 and redundantly encode information to allow for errors in the printing or reading of the code. A preferred embodiment, described subsequently, uses this technique to robustly store the equivalent of a 64-bit number in code 101.

Two of the many features of code of the present invention is that the arrangement of data cells 411 allows for robust code printing on low quality media such as with ink on newsprint. The first feature is that no individual data cell 411 is surrounded only by other data cells or can be totally surrounded by black space. This feature accommodates peculiarities of some standard printing processes, such as printing of newspapers. One property of ink on newsprint is that due to surface tension, ink tends to fill in unprinted areas—especially small unprinted areas. Code 101 is a high density code and is comprised of many small areas. Errors due to printing can be reduced by not allowing white data cells to be surrounded by black data cells or other black features. Reserved white space 405 is selected so that none of data cells 411 can be totally surrounded by black, either due to black data cells or black targets 407.

The second feature of data cells 411 allows for a more robust code by numbering the cells is a way that enhances the ability of the Reed-Solomon (R-S) error correction scheme to correct for reading errors. R-S groups bits into "symbols" to which error correction algorithms are applied, and thus is particularly good at correcting for any errors within a symbol. The effectiveness of R-S is enhanced by arranging and numbering data cells 411 so that likely printing or reading errors are more likely to lie within one symbol and less likely to fall within more than one symbol. Since many errors are due to localized errors from the printing process or due to irregularities in the paper, the effectiveness of R-S is enhanced by grouping the cells near one another so that within a symbol it is more likely that cells will be adjacent to other cells of the same symbol than to cells of other symbols. One method of determining the effectiveness of numbering schemes, would be to count the number of adjacent cell edges that are within a symbol and then count the number of adjacent cell edges that cross a symbol boundary. As an example, if cells are arranged sequentially on a line, with 6 cells (or bits) to a symbol, all cell edges between cells 1,2,3,4,5,6 (or 5 boundaries within the symbol) would be in one symbol, while the edge cells (1 and 6) would each have one border with another symbols, resulting in 2 boundaries with other symbols. Thus an ideal ratio for contiguous data would be 5/2.

Quality Control

Space is reserved within code 101 to allow for determining quality of both the printing and reading processes. As shown in code specification 401 one of hexagonal cells 419, specifically quality control cell 413, is reserved for this purpose. Quality control cell 413 can be of any color or pattern, and can be the same or varied among codes having the same contents stored within data cells 411. Thus codes storing identical information may appear different due to differences in the content of quality control cell 413.

By sampling quality control cell 413 when the code is read and sending back an unprocessed gray-scale image to a central location, it is possible to detect and track a large number of different parameters that pertain to code printing (such as optical properties of the ink and background) and reading quality (such as accuracy of the imaging system, variability and degradation of the finder, and accuracy of various image processing algorithms). Examples of some of the possible quality issues that can be tracked either individually or simultaneously with an appropriate quality control cell include: using a white cell to determine the average white level of paper as determined by finder 107 and determine the importance of paper defects; using a black cell to determine the average black level as seen by the finder; and using horizontal or vertical lines to determine the orientation of the finder, the actual horizontal or vertical size of the cell as printed and the accuracy of various image processing algorithms. In addition, other factors that can be determined include: quality of illumination, illumination correction algorithm, and the perception of color by the finder.

Encoding

There are many techniques known in the art for encoding and encrypting information. The following disclosure illustrates one of the ways that a number can be encoded, encrypted and stored in an optical pattern. In light of this disclosure, it would be obvious to incorporate these alternative techniques, either individually or in combination, into or in place of the encoding process described herein. In one embodiment of the present invention the specification 401 allows for storing a 66-bit number. Further, in this embodiment, the 66 bits are partitioned into 64 bits of digital code information, considered to be the 64-bit number and an additional 2 bits, which may or may not contain useful information. A digital code size of 64 bits is chosen to have digital code information since this number is compatible with many computer architectures and provides a great many code combinations—greater than $10^{19}$. The additional 2 bits are added to provide the required 66 bits to the encoding algorithm, as described subsequently. The information contained in code 101 including the original 64-bit number is processed by an error correction algorithm to enhance the robustness of the matrix code, and may optionally include encryption so that only the entity generating the code knows the true value of the code.

One possible embodiment for converting a 64-bit number into a code is illustrated in FIG. 5. A 64-bit number is chosen for storage by code 101 (block 501). The 64-bit number may be partitioned into two or more fields. These fields can provide processing advantages: for example, a field may indicate attributes of the code, or may indicate a server or method of locating information relevant to the code. A robust error correction algorithm that allows for some reading errors, in this case the (19,11) Reed-Solomon error correction algorithm, is used to store 64 bits in the 114 data cells 411. The (19,11) R-S algorithm operates on 11 symbols of 6 bits each, or 66 bits. Thus two additional bits are incorporated into the 64-bit number, either as most significant or least significant bits, resulting in a 66-bit number (block 503). The two additional bits may or may not contain useful information. Embodiments include having the two additional bits contain no useful information, or alternatively to control functions or operation of the finder, which may include but are not limited to: allowing the finder to store multiple copies, controlling which communication device the finder can communicate with, or specifying a special feedback melody.

The 66-bit number of this embodiment can optionally be encrypted so that only the generator of the code knows what number the code actually contains. The (19,11) R-S algorithms then generates a 114-bit number (block 505) corresponding to an error corrected representation of the 66-bit number. The 114-bit number is then encoded according to specification 401 to form a pattern of code 101 (code 507). This pattern is subsequently supplied to a printer in the form of a postscript, pdf, or any other format appropriate for incorporation of the code onto the surface of an article.

Acquiring Coded Information

Having described how data is coded in the present invention, the acquisition and decoding of matrix codes of the present invention follows. This description is illustrative of one device that can acquire, decode and transmit coded information. It will be understood by those skilled in the art that there are numerous methods for acquiring such images. It will also be appreciated that some of techniques for decoding may depend on the device used to acquire the code. In addition, the decoding steps may be accomplish the aspects of the present invention by being performed in a different order than that of the embodiment illustrated below, and that advances in computer hardware and software allow for many of the steps to be performed in either hardware or software, or allow them to be performed in different locations It is therefore understood that many alternative embodiments exist for acquiring, decoding and transmitting information, including other optical, electronic, and software components and combinations. The subsequent description is indicative of one such embodiment and is not meant to limit the scope of the present invention.

Finder

FIG. 7 shows a schematic of a contact finder of the present invention. The embodiment of FIGS. 1 and 7 is a portable, personal, electronic device that reads codes and holds the information until it can transmit the dot code to an external computer. Internal to finder 107 are a battery 717, an optics assembly 701 consisting of and holding together imaging optics 703, a two-dimensional image sensor 705, an LED illuminator 707, a processor 709 in communication with sensor 705, a memory 711 for storing images, and wireless electronics 715 for transmitting information to external devices that is connected to an antenna 113, which may be partially external to case 103, and a feedback LED and/or audio PZT 713 to communicate back to the user of finder 107. External to or on case 103 of finder 107 is a finder tip 111 which includes a front surface of transparent nosepiece 719, a tip switch 115. A Nosepiece 719 may either be incorporated into case 103, within optics assembly 701 or may be separate from both. Nosepiece 719 is used for illuminating and imaging code 101, and also allows for aligning and assurance of proper working of finder 107 by the user of the finder.

When tip 111 is brought near code 101, tip switch 115 is activated, supplying power to finder 107 and indicating to processor 709 that code 101 is to be read. Power is also supplied to LED illuminator 707 for illuminating code 101 through nosepiece 719. The focus of optics assembly brings an image of code 101 onto sensor 705 when switch 115 is depressed. Code 101 is imaged through nosepiece 719 by optics assembly 701 which produces an image of code 101 onto sensor 705. Optics assembly may include lenses for focusing light, prisms for shortening the physical size of finder 107 and correcting some lens aberrations, and optical filters to reduce stray light or light of specific wavelengths or polarizations that might interfere with processing of the image obtained by sensor 705. The two-dimensional sensor 705 converts the image of code 101 into a two-dimensional digital image that, in one embodiment, stores the image as a monochrome, 288×350 pixel image, using byte per pixel.

Processor 709 controls the electronics of finder 107, including sensor 705, image processing and communications, and as such the order of operation of the various finder components and the image processing techniques can be controlled and optimized to provide the most reliable code reading. One specific embodiment is described subsequently in conjunction with FIG. 6. In communication with processor 709 is memory 711, which is used to perform many important functions in finder 107. Specifically, memory 711 is used to hold operating instructions for finder 107 and to hold code information for later transmittal. Memory 711 may consist of read-only or Flash memory to hold the firmware, read/write memory to hold the code image during processing and for other uses, non-volatile memory to hold code information, finder serial numbers, time stamps and other information stored during power-down or power-off.

Code information can be used by other electronics (not shown) within finder 107, for example to provide software or hardware settings to the finder, or can be transmitted to one or more other electronic devices that perform tasks based on the transmission. The other electronic devices can either be stand-alone devices, or can be connected to yet other devices, preferable through a network, such as the Internet. In one example of an application, as a result of a transmission, an email is generated. Many other applications, discussed subsequently, are possible. Many of these involve systems of devices in communication. For example, finder 107 may be in communication with a transceiver (not shown) that is connected through a network to one or more other devices. Thus code 101 may request information from other devices or computers or used to instigate the transfer of information between many of the networked devices. Alternatively, the transmissions may be through wired communication (not shown), with additional finder embodiments having wired communications only.

Once finder 107 as acquired a code, an important aspect of the present invention is to provide feedback to the user is a signaling of the correct reading of the code. Feedback 713 is provided by audio, visual, vibration or by combinations thereof indicate a successful reading of the code. Additionally, signaling to the user may take place through other means. Confirmation of an attempted read can take place either through the tactile sensation of switch 115 being toggled, while visual cues can be communicated through a variation in the illumination from LED illuminator 707 or by other signaling LEDs (not shown) included in finder 107.

Reception of the code and subsequent actions from receiving the code are controlled, in the embodiment shown in FIG. 1, on computer 119. Computer 119 includes a receiver (not shown) that either periodically or continuously seeks out signals from finder 107. In a preferred embodiment, computer 119 includes a computer program that runs in the "background" and executes a series of commands when finder 107 is within range without user intervention. These commands include receiving transmissions to finder 107, sending commands, such as "code received" commands, to the finder, and communicating to the user or over a computer connection, such as Internet connection 121, when a code has been received. When finder 107 is within range of the receiver, wireless connection 117 transmits information from finder 107 to computer 119. In one embodiment, the transmitted information is a binary code as indicated in code 101. In another embodiment, the transmitted information includes one or all of the following: information related to quality control of various code reproduction and reading processes, a time stamp corresponding to when code 101 was acquired, and information related to finder 107, such as a finder identify, finder operating conditions, or user settings.

The response of computer 119 to reception of wireless transmission 117 depend on the use to which code 101 is put. In one embodiment computer 119, after receiving code 101, transmits the information received from finder 107 along with other information particular to and contained in computer 119, such a user demographics or user specific information and an email address for future contact to a second computer. In another embodiment, the second computer instructs a third computer to forward information to the specified email address.

In another embodiment, feedback 713 is also provided to indicate the successful reception, acceptance or actions performed by the reception of the code 101 by other electronic devices. Wireless electronics 715 are configured to receive information, specifically an indication of a successful transmission, which can be used within the finder 107 to perform various functions. This indication can be in the form of a received signal having the same dot code and/or time stamp of a code 101 in memory 711. The reception of this indication can be used to trigger feedback 713 and erase from memory 711 stored code 101.

In addition to the components described, it would be obvious to one skilled in the art that a finder having the functions and components described herein require miscellaneous electronic, electric and mechanical components to support the above major elements, and thus a finder of the present invention may contain equivalent structures to achieve the various aspects of the invention.

Additional Finder Embodiments

Finder 107 can also incorporate other features and modes of operation to aid in its use. In one embodiment, wireless electronics 715 is capable of receiving signals. By receiving signals, finder 107 can perform additional functions which are advantageous, such as: providing feedback 715 and erasing received codes from memory 711, as previously discussed; downloading software updates or additional software for execution by processor 709 for new or improved operation of the finder; notification that battery 717 may be in need of replacement; or notification; or feedback for the playing of a finder-based game. Finder 107 may also contain an alphanumeric or other display device (not shown) for communication or notification to the user.

Additionally, finder 107 may also contain buttons, switches or other input devices (not shown) for either modifying the function or action of the finder, such as selection of a particular feedback 713, or for altering the retention of codes in memory 711. In addition, such input devices (not shown) can also transmit information that modifies the interpretation, modification or activities performed in conjunction with finder 107 operation or interpretation of the code 101 by other electronic devices (not shown). Thus a button may indicate that the user wishes to be responded to at one location or another, may want to transmit limited amount of information, such as finder information that can be traced back to a particular user.

In addition, one of the aspects of the finder of the present invention is portability. As codes come into greater use, it would be advantageous to incorporate the finder into other objects, so that a user can easily and handily have a finder nearby. Other objects that the finder may be incorporated into include, but are not limited to: a pager, a cellular telephone, a wireless telephone, a personal digital assistant, an electronic organizer, a calculator, a pen, a toy, a computer mouse, a credit card, a debit card, and an automated teller machine card.

Data Acquisition and Image Processing

The finder of the previous discussion, shown in detail in the schematic diagram of FIG. 7, is one embodiment of a device for acquiring a code of the present invention. FIG. 6 is a schematic diagram of one embodiment of a process for using finder 107 to acquire the information from code 101. The number labeling the following paragraphs refer to blocks in the schematic diagram of FIG. 6.

1. User Taps Code

A user attempts to acquire a code 101 by holding case 103 of finder 107, aligning the finder perpendicularly with code 101 as shown in FIG. 1, and bringing the code in contact with tip 111, activating tip switch 115. Optical assembly 701 is configured so that an object located near the activated tip switch 115 is in focus, projecting an image of the object onto sensor 705. As a result of activating switch 115, LED illuminator 707 is energized, illuminating the focus of optics 701. Subsequent steps of FIG. 6 are automatically executed by electronics in the finder to determine if a code has been successfully read and to signal the user of the code reading status.

2. Transfer Dot Image to Memory

With the image area illuminated, an image from sensor 705 is read by processor 709 and written into memory 711. This image, which is 288×350 pixels with one byte per pixel, is processed to determine the contents of code 101.

3. Is there enough light to read the printed medium?

The amount of light received by sensor 705 must fall within certain limits to allow the subsequent image processing to be produce accurate results. This step computes the average value intensity for all of the pixels, and compares that number to threshold values. If there is too much or too little light, go to step 4 to prepare and acquire another image. Otherwise go to step 6 and process the image. In an alternative embodiment, this step computes a histogram of the pixel values in the image, finds a threshold point using Nobiyuki Otsu's between-group-variance bimodal-histogram algorithm, finds the mean and standard deviation of the black and white modes, and makes a judgment about contrast and illumination level based on the distance between the mode centers and the distance from the black or white ends.

4. Adjust sensor sensitivity?

This step is reached when the amount of light does not fall within threshold values. Exposure is controlled by having processor 709 adjust sensor 705 parameters to compensate for the light level. For example, if the image is too dark, an increased integration time of sensor 705 will increase the exposure. An alternative method would be to control LED illuminator 707 with processor 709 and to adjust the light level by, for example, a pulse width modulation technique.

5. Re-acquire Image.

With the illumination adjusted by step 4, a new image is acquired. In one finder 107 embodiment, the finder can reacquire multiple images in one tap without the user being informed that any acquisition difficulties have been encountered.

In an alternative embodiment, the finder is not capable of acquiring multiple images in one tap, and the feedback 713 signals the user to tap reacquire the code by re-tapping and going to step 1 (not shown in FIG. 6).

6. Correct Illumination Field

Acquired images may have a variation in intensity from center to edge; usually with a higher intensity at the center of the field than at the edges. This step uses an algorithm to process the image to "flatten" the amount of illumination across the field, resulting in a uniform intensity of reserved white space 405. In one embodiment, the algorithm includes a morphological "closure" (erosion+dilation) with a symmetrical disc shape model that is slightly larger than perimeter 415. This is an N-order algorithm, with a factor of 45 for a 5.0 mm image. In an alternative embodiment a sparse-kernel, bimodal-weighted median-filter algorithm is used. The alternative embodiment incorporates an algorithm that bimodally separates the histogram of values under a sparse kernel of points. The points are distributed in a roughly circular area slightly larger than the largest dark object. Using this algorithm, the kernel will nearly include some light pixels in it, and the sparseness allows for efficient elimination of redundant data. The algorithm then uses the "brighter" mode to calculate the median—even if the "darker" mode has more pixels. This results in an N-order algorithm, with a factor on the order of 10 (depending on the kernel sparseness), and may or may not require more inner-loop processing than the morphological closure algorithm.

After the background is isolated by this step, the background image is subtracted from the original image, resulting in an image having an uniform background.

7. Correct Aspect Ratio

In one embodiment, sensor 705 has pixels that are rectangular with a ratio of about 1.097. This tends to distort the aspect ratio of the image, which is corrected in this step to simulate an image acquired with a sensor having square pixels. Numerous algorithms are know in the art to perform this step effectively. In one embodiment, an arbitrary-scaling function is used, in which a cumulative interpolation in the vertical dimension us used to compress the rows. Specifically, the interpolation proceeds by reading input rows, accumulates them proportionally to their interpolated position, and writes an output row whenever one is "complete". This step is not necessary for sensors having square pixels or using imaging systems that produce square images of square objects.

8. Locate Area of Interest

This step determines location of code 101 using targets 403 using a morphological "closure" filter having a symmetrical disc shape model with a radius just slightly smaller than perimeter 415 to locate the three features 423. After the closure of this step, any object with dimensions smaller than features 423 will be eliminated, and the output will consists only of three round islands, spaced at the corners of an equilateral triangle. The morphological closure is an efficient arbitrary-size filter, which, unlike blurring or other neighborhood low-pass functions, contributes very little distortion to the edge effects of the objects that remain.

9. Compute Likely Black/White Threshold

This step selects a gray level as a threshold for the black/white thresholding decisions using the "Otsu between-group variance" histogram-thresholding algorithm This technique has an absolute index of contrast so that the output of step 8 can be double checked to validate that existence of features 423 and serving as a check for plausible code data The position of the peak of the "between-group variance" index gives the best threshold for the image. Because the image has been background-normalized, in step 6, this step is very reliable.

10. Is Threshold Within Range

If the selected threshold from the previous step is not within a preset range, then target 301 has not been found by the previous image processing steps and processing stops.

11. Locate Main Target

This step locates the location of target 403 and determines its orientation relative to other code features as per code specification 401. In this step the three thresholded features 423 are cataloged by component-labeling, and their centroids are computed. The list is filtered for relevant area by filtering out any gross edge artifacts and any potential small artifacts at edges of larger regions that light up from the thresholding. The cumulative centroid of the candidate-triplet is located at the "gross" center of the dot. It is a gross center because features 423 are not circles but are ovoid. The morphological filter thus results in a slight counter-clockwise rotational error and a very slight centroid error. An estimate of this error could be included to further reduce correlation complexity.

This step then scans the centroid-candidate list, looking among all triplet-combinations for one or more combinations that match the expected values. For valid images, there should always be one candidate triplet. If more than one candidate-triplet is found, step 12 is performed on all candidates to select one candidate-triplet.

12. Determine One of Three Rotations

Having identified code 101 to within a possible rotational error, this step determines the proper "home" gross rotation, and also determines the fine rotation of the dot. Since target 403 has three-fold symmetry, the error is either 0, 120 or 240 degrees from the acquired image. There are several embodiments that can be used to determine the proper orientation. In one embodiment, the presence of a mark 417 near or just outside of perimeter 415 can be used. This may be any reasonable amount of black printing including a blob, text, a shape or other element. As a portion of target 403 is not functional and is distinct, it may be trademarked, and thus mark 417 could be a trademark symbol such as ™ or ®. In this step both target 403 (the coarse target) and target 407 (the fine target) are used to determine the rotational orientation of the image.

One algorithm that determines rotational orientation follows:

a. Pre-rotate the image using mark 417 to each of the three candidate rotations of the candidate image.

b. Correlate the images based on where mark 417 is expected and use the highest score to pick that rotation.

c. Normalize-rotate that image so the nominal "top" target 403 is straight up.

d. Correlate a precision model using target 403 and target 407 to get the high-resolution centroid and verify the candidate-rotation selection.

An alternative algorithm that does not require mark 417 consists of three correlations as described below:

a Normalize-rotate the image into its three possible "home" positions, with one of each target 403 straight up.

b. Correlate a precision model using target 403 and target 407 on each of the three candidate rotated images.

c. Pick the best score and keep that image for further processing.

In yet another alternative embodiment, the fine rotation is determined first. This can improve the reliability and precision of fine-location and fine-scale determination.

a. Normalize-rotate the image into the one closest "home" position, with one of each target 403 straight up.

b. Correlate a precision model using a single arm of target 403 on the candidate rotated image. This results in a precise rotational error correction for any of the three possible positions.

c. Normalize-rotate the image into its three possible "home" positions, with one of each target 403 straight up, corrected by the precise rotational error.

d. Correlate a precision model using each of the four target regions 403 on each of the three images, now corrected by precise rotational error. Combine the scores from the four target regions 403 by weighted mean and pick the best combined score out of the three images, and keep that image for further processing.

13. Locate Fine Target Edges

This step is used to determine fine position and aspect ratio of code 101. The edges of target 407 closest to perimeter 415 are used for this purpose. As a result of previous steps, the locations of black and white edges of target 407 closest to perimeter 415 are known fairly well. The locations are determined by correlation, and the resulting edge-location data is used to fine-correct the centroid and X and Y scale of the image. The correlation is done in gray-scale (8-bit pixels) for higher accuracy.

14. Compute Fine Position and Size

Each edge located from the previous step provides one scalar quantity: the distance of the edge from the centroid of code 101. The resulting four scalars are easily used to determine x-center, y-center, x-size and y-size, and hence scaling of the code. For example, the x-center is the average of the location of the two x-targets, and the x-size is the difference of the two x-targets. Aspect ratio is a ratio of the x-size to y-size.

Optionally, steps 13 and 14 may be repeated to increase accuracy of these steps. Knowing the exact location on one axis could cause a slight shift of the output of the correlator for the target(s) on the other axis. Thus a second pass on these two steps may yield a more accurate fine position.

15. Verify Fine Position, Size, Aspect Ratio within Range

In this step the computed find positions are compared against expected values. If the values are within the expected range, then processing proceeds, else it is stopped. The computed fine positions, size and aspect ratio are compared against fixed thresholds. In one embodiment, code 101 is permitted to be printed within +/−15% of an ideal size. In addition, the location of the dot in the field must be such that all of the data cells and the fine target edges are within the field of view of the sensor. If any parameter is out of range, stop processing.

16. Compute the Location of the Data Cells

The positions of the 114 data cells 411 and one quality control cell 413 are computed next. The centroids of the hexagonal data cells are maintained in a static list in processor 709 or memory 711 as with 115 entries. In one embodiment each list element consists of a signed x and y offset from the ideal centroid of the dot.

17. First Pass Dot Read

A first attempt is made to determine the coded information. This is done by determining the optical state, and thus the binary value, of each cell. In addition a quality index for each cell, which is the likelihood that the optical state was determined correctly, is computed.

The algorithm uses a neighborhood grayscale histogram around the centroid of each cell. An Otsu between-group variance analysis gives an index of contrast within the cell. A good cell should have low contrast since the color within the cell should be uniform. Analyzing the pixel levels within each cell, the proportion of pixels on either side of the Otsu threshold will be taken as the first-guess cell value read. If more than 60% of the pixels are bright, the cell will be assigned a value of 1; if more than 60% of the pixels are dark, the cell will be assigned a value of −1; and no more than 60% of the pixels are dark or light, then the cell will be assigned a value of 0, indicated that the read was ambiguous. Ideally, all cells would receive a value of +1 or −1, which correspond to ideal binarization of zero and one, respectively.

18. Second Pass Dot Read

Using information from the first read, an improved cell-polarity determination (binarization) can be achieved in this step. In the process of printing the code, ink may bleed or recede, causing the ink within a particular cell to be affected by the ink in the surrounding cells. To correct for this, this step re-computes the value of each cell by taking into account the values of the neighboring cells.

In one embodiment, this step abstracts the first-pass polarity and confidence for a given cell and its neighbors into a set of seven scores, one for each cell. This set of seven scores is correlated against a list of pre-determined patterns, and the best match supplies a new polarity and confidence level for the center cell. The intent is to account for the lightening and darkening influence of the surrounding cells in the list of pre-determined patterns, and if a good match is found in this list, we can increase the confidence of the cell-polarity determination. The list can be built theoretically at first but enriched with empirical data later to increase its reliability. At the end of this pass, if the confidence level is still low, the cell becomes an "erasure" for the purposes of the error correction to come next.

In an alternative embodiment, this step uses cumulative histograms from the high-confidence black and white cells, and the contrast distributions are used to weight the judgment and confidence of ambiguous (low-confidence) cells. In yet another alternative embodiment, this step uses all the possible patterns of light and dark surrounding cells to construct correlation models for each center cell. The surrounding cells are blurred or otherwise bled into the center cell, creating two models for each pattern: one for a black center cell, and one for a white center cell. The encroachment of the blurring creates a model of the expected dark and light distribution in the center cell. The black and white models are each correlated with each center cell in question, and again results in a polarity and confidence score. This last described embodiment is more computationally intensive than some of the previous embodiment, but yields a higher selectivity for good cells vs. those with arbitrary defects based on the directionality of the correlation models.

As an alternative method of identifying erasures, the Otsu contrast-index of each cell could be compared against a fixed (or variable) threshold. As an example of this embodiment, those "worse" cells—i.e. those cells least likely to have been binarized correctly—are marked as erasures, up to some limit of eight symbols, as a particular example of this embodiment. Continuing with this example, if seven or more symbols are to be identified as erasures, the dot would be considered too defective to proceed and processing stops.

At this point a determination of data has been made for each of the 114 data cells. Specifically, each cell has either been assigned a polarity, which is indicative of the data value, or has been determined to be an "erasure" for the purpose of data correction.

19. Reed-Solomon Error Correction

The 114 data cells of the previous step contain 114 bits of information, less the number of bits associated with erasures. Since code 101 stores 66 bits of information in 114 bits, there are 48 parity bits. The parity bits are used by Reed-Solomon algorithms to redundantly store information, and thus the original 66-bits can be extracted, even if some of the 114 data cells are incorrect or erasures (that is, they were binarized incorrectly, are unreadable, or ambiguous).

A Reed-Solomon algorithm is now used to extract a (hopefully) valid 66-bit number from the 114 data cells, including the erasure information. This algorithm works in conjunction with the encoding algorithm, which produced the 114-bit number of code 101 using the 64 data cells plus two special cells using a (19,11) Reed-Solomon Forward Error Correction Algorithm. To extract the 66-bit number from the data cell values determined from the previous step, the (19,11) Reed-Solomon algorithm is applied to the 114 binary values, which may include some number that are erasures. Using 6-bit symbols, there are 11 symbols (66 bits) for the data plus 8 symbols (48 bits) for the R-S parity bits. Cells that have previously been identified as "erasure" cells cause the symbol in which they reside to be identified as an erasure symbol to the R-S algorithm The R-S algorithm can correct up to x incorrect symbols and y erasure symbols subject to the constraint that 2*x+y<=8.

20. Did Reed-Solomon Pass

If the R-S algorithm indicates that it was unable to correct the data then processing stops.

21. Provide User Feedback

In this step, the user is provided with an indication that a dot has been successfully read. Thus a blink of an LED indicator and/or an audible indication could be used to indicate that the dot read is successful. Alternative method, such as modification of the illumination are possible.

22. Store the Code Data in Memory or Transmit Data

The 66 data bits are saved in non-volatile memory for immediate or future transmission. Along with the 66 bits, a time stamp of the time of reading, consisting of a simple 32-bit clock counter with a period of between 0.01 and 30 seconds, is stored. Multiple codes are saved in memory, up to the physical limit of the non-volatile memory. A ring buffer is used, so that if the memory overflows, the oldest code data are re-written with newer data.

At this point, the finder has stored one or more codes an corresponding time stamp information. When communication is established through wireless electronics 715 or wired means of alternative finder embodiments, the 66 data bit and additional time stamp information is transmitted to an external transceiver (not shown). Alternatively, the finder could transmit upon reaching this step, without storing the code in memory.

Conclusion

The invention has now been explained with regard to specific embodiments. Variations on these embodiments and other embodiments may be apparent to those of skill in the art. It is therefore intended that the invention not be limited by the discussion of specific embodiments. It is understood that the examples and embodiments described herein are for illustrative purposes only and that various modifications or changes in light thereof will be suggested to persons skilled in the art and are to be included within the spirit and purview of this application and scope of the appended claims.

What is claimed:

1. A two-dimensional code, comprising a plurality of data cells adjoining one another over at least one two-dimensional area of a surface and that optically stores information on the surface, individual ones of said plurality of data cells having predetermined shapes and positions and having one of at least two optical properties, and wherein individual ones of said plurality of data cells do not adjoin any other of said plurality of data cells on all sides.

2. The code of claim 1, further comprising one or more quality cells that provide code quality information, individual ones of said one or more quality cells having predetermined shapes, positions and optical properties.

3. The code of claim 1, wherein said at least two optical properties is exactly two optical properties.

4. The code of claim 1, wherein said plurality of data cells are arranged in two or more contiguous groups.

5. The code of claim 1, wherein said shapes are hexagons.

6. The code of claim 1, wherein said positions are arranged on a regular grid.

7. The code of claim 6, wherein said regular grid is a hexagonal grid.

8. The code of claim 1, further comprising a plurality of target elements that provides reference positions relative to said plurality of data cells, wherein individual ones of said target elements have predetermined optical properties and positions relative to said predetermined position of said plurality of data cells, and wherein said plurality of target elements are confined within a perimeter, where said perimeter is the perimeter of a defined shape having the minimum area to confine said plurality of target elements.

9. A two-dimensional code, comprising:
   a plurality of data cells that optically stores information on a surface, individual ones of said plurality of data cells having predetermined shapes and positions and having one of at least two optical properties, where individual ones of said plurality of data cells do not adjoin others of said plurality of data cells on all sides, and
   a plurality of target elements that provides reference positions relative to said plurality of data cells, wherein individual ones of said target elements have predetermined optical properties and positions relative to said predetermined position of said plurality of data cells, wherein said plurality of target elements are confined within a perimeter, where said perimeter is the perimeter of a defined shape having the minimum area to confine said plurality of target elements, and wherein the distance between any two points of said plurality of target elements is within 15% of the predetermined shapes and positions of said plurality of target elements.

10. The code of claim 8, wherein said plurality of data cells are substantially confined by said perimeter.

11. The code of claim 8, wherein said defined shape is a regular polygon.

12. The code of claim 8, wherein said defined shape is an ellipse.

13. The code of claim 12, wherein said ellipse is a circle.

14. The code of claim 13, wherein the combination of said plurality of data cells and said plurality of target elements form a code image, and wherein said code image has no evident rotational orientation.

15. A two-dimensional code, comprising:
   a plurality of data cells that optically stores information on a surface, individual ones of said plurality of data cells having predetermined shapes and positions and having one of at least two optical properties, where individual ones of said plurality of data cells do not adjoin others of said plurality of data cells on all sides,
   a plurality of target elements that provides reference positions relative to said plurality of data cells, wherein individual ones of said target elements have predetermined optical properties and positions relative to said predetermined position of said plurality of data cells, wherein said plurality of target elements are confined within a perimeter, where said perimeter is the perimeter of an ellipse having the minimum area to confine said plurality of target elements, said plurality of target elements further comprising:
      a plurality of first target elements substantially distinct from said plurality of data cells, such that said plurality of first target elements provide an indication of the approximate location of said plurality of data cells; and
      a plurality of second target elements, where said second target provides an indication of the approximate locations of individual ones of said plurality of data cells.

16. The code of claim 15, wherein said plurality of second target elements are substantially positioned near said perimeter.

17. The code of claim 15, wherein said ellipse has a centroid, and wherein said plurality of first target elements have a substantially radial component extending approximately from said perimeter to approximately said centroid.

18. The code of claim 17, wherein said plurality of data cells are arranged on a regular grid, wherein individual ones of said first target elements have corresponding first target perimeters, and wherein a substantial portion of individual ones of said plurality of first perimeters are not aligned with said regular grid.

19. The code of claim 15, wherein said ellipse is a circle.

20. A two-dimensional code comprising:
   a plurality of data cells that optically stores information, wherein said plurality of data cells individually have one of at least two optical properties and where said plurality of data cells are located on a regular grid and are confined within a periphery; and
   a target having predetermined optical properties and boundaries relative to a position of said plurality of data cells, where at least a portion of said boundaries does not lie on said regular grid, where a portion of said target is in proximity to said periphery, and where a portion of said target has approximately radial features distinct from said plurality of data cells.

21. The code of claim 20, wherein a combination of said plurality of data cells and said target form a code image, and wherein a preferred rotational orientation of said code image is not evident.

22. The code of claim 20, further comprising one or more quality cells that provide code quality information, individual ones of said one or more quality cells having predetermined shapes, positions and optical properties.

23. The code of claim 20, wherein said target has a target centroid, wherein said plurality of data cells has a data centroid, and wherein said target centroid is adjacent to said data centroid.

24. The code of claim 20, wherein said plurality of data cells is arranged in two or more contiguous groups, and wherein each of said two or more contiguous groups is separated by a portion of said target.

25. The code of claim 20, wherein a portion of said target is embedded in said plurality of data cells.

26. The code of claim 20, wherein a portion of said target has n-fold radial symmetry, where n is equal to three.

27. The code of claim 20, wherein said target is a first target, and further comprising a second target for locating said plurality of data cells, said second target having predetermined optical properties and boundaries relative to the position of said plurality of data cells, where said second target is substantially near said periphery.

28. A two-dimensional code comprising:
   a plurality of data cells that optically stores information, individual ones of said plurality of data cells having predetermined boundaries and having one of at least two optical properties; and
   a target having predetermined optical properties and boundaries relative to a position of said plurality of data cells, where said target is confined within an enclosed curvilinear shape having a periphery,
   where said plurality of data cells are substantially enclosed within said periphery, and where a portion of said target has approximately radial features distinct from said plurality of data cells.

29. The code of claim 28, further comprising one or more quality cells that provide code quality information, individual ones of said one or more quality cells having predetermined shapes, positions and optical properties.

30. The code of claim 28, wherein said boundary of individual ones of said plurality of data cells adjoins at least some of an interior of said enclosed curvilinear shape that is not one of said plurality of data cells.

31. The code of claim 28, wherein said plurality of data cells are arranged on a hexagonal grid.

32. The code of claim 28, wherein said plurality of data cells are arranged in two or more contiguous groups.

33. The code of claim 28, wherein said enclosed curvilinear shape is an ellipse.

34. The code of claim 28, wherein said target is embedded in said plurality of data cells.

35. The code of claim 28, wherein said target is a first target, and further comprising a second target for locating said plurality of data cells, said second target having predetermined optical properties and boundaries relative to said boundaries of said plurality of data cells, where said second target is substantially near said periphery.

36. The code of claim 28, wherein said target has a target centroid, wherein said enclosed curvilinear shape is an ellipse having a code centroid, wherein said centroid offset is a distance between said code centroid and said target centroid, and wherein said centroid offset is less than or equal to 20% of said ellipse minor diameter.

37. A two-dimensional code comprising:
   a plurality of data cells that optically stores information, individual ones of said plurality of data cells having predetermined shapes and positions and having one of at least two optical properties; and
   a target having predetermined optical properties, shapes, and positions relative to the position of said plurality of data cells, where a portion of said target has n-fold radial symmetry, where n is equal to three.

38. The code of claim 37, further comprising one or more quality cells that provide code quality information, individual ones of said one or more quality cells having predetermined shapes, positions and optical properties.

39. A two-dimensional code comprising:
   a plurality of data cells that optically stores information, individual ones of said plurality of data cells having predetermined shapes and positions and having one of at least two optical properties; and
   a target having predetermined optical properties, shapes, and positions relative to the position of said plurality of data cells, such that a portion of said target is distinct and the code is easily recognizable.

40. The code of claim 39, wherein said target includes a distinctive symbol, where said distinctive symbol indicates the orientation of said code.

41. The code of claim 40, wherein said portion of said target is a trademark.

42. The code of claim 39, further comprising one or more quality cells that provide code quality information, individual ones of said one or more quality cells having predetermined shapes, positions and optical properties.

43. A two-dimensional code comprising:
   a plurality of data cells that optically stores information, individual ones of said plurality of data cells having predetermined shapes and locations and having one of at least two optical properties, and said plurality of data cells having a data centroid; and
   a target having predetermined optical properties, shapes, and locations relative to a position of said plurality of data cells, said target enclosed within an enclosed curvilinear shape having a periphery and a target centroid, where a portion of said target has approximately radial features distinct from said plurality of data cells, where said target centroid is adjacent to said data centroid, and where said plurality of data cells are substantially enclosed within said periphery.

44. The code of claim 43, wherein said enclosed curvilinear shape is an ellipse.

45. The code of claim 43, wherein said ellipse has a major diameter and wherein a distance between said data centroid and said target centroid is less than or equal to 20% of said major diameter.

46. The code of claim 43, further comprising one or more quality cells that provide code quality information, individual ones of said one or more quality cells having predetermined shapes, positions and optical properties.

47. The code of claim 43, wherein said enclosed curvilinear shape is a circle.

48. The code of claim 43, wherein individual ones of said plurality of data cells has a boundary, and wherein each of said boundaries adjoins at least some of the interior of said enclosed curvilinear code shape that is not one of said plurality of data cells.

49. The code of claim 43, wherein said plurality of data cells are arranged on a hexagonal grid.

50. The code of claim 43, wherein said target has n-fold radial symmetry, where n is equal to three.

51. The code of claim 43, wherein said plurality of data cells are arranged in two or more contiguous groups.

52. A two-dimensional code comprising:
   a plurality of data cells that optically stores information, individual ones of said plurality of data cells having predetermined shapes and locations and having one of at least two optical properties; and
   two or more symbols comprising equal numbers of said plurality of data cells, where said predetermined shapes and locations of said plurality of data cells are arranged such that adjoining data cells are more likely to belong to the same symbol than to a different symbol such that the code is tolerant of printing errors.

53. The code of claim 52, wherein said code further comprising background space that is not one of said plurality of data cells, and wherein at least some of said plurality of data cells are adjoined by background space for a purpose of decreasing a number of individual ones of said plurality of data cells that adjoin data cells belonging to a different symbol.

54. The code of claim 52, wherein each of said plurality of data cells within one of said two or more symbols has a number of adjoining data cells within the same symbol, and wherein said predetermined shapes and locations of said plurality of data cells are arranged to maximize said number.

55. The code of claim 52, wherein each of said plurality of data cells within one of said two or more symbols has a number of adjoining data cells within a different symbol, and wherein said predetermined shapes and locations of said plurality of data cells are arranged to minimize said number.

56. The code of claim 52, wherein each of said plurality of data cells within one of said two or more symbols has a ratio given by a number of adjoining data cells within the same symbol divided by the number of adjoining data cells within a different symbol, and wherein said predetermined shapes and locations of said plurality of data cells are arranged to maximize said number.

57. A method for storing information on a surface in a two-dimensional code comprising:
   converting said information into a code pattern, said code pattern having two or more optical properties that spatially vary according to said information, and where said code pattern has predetermined shapes and locations, and is enclosed within a curvilinear code shape having a periphery;
   applying said code pattern to said surface; and applying a target for locating said code to said surface, said target comprising a predetermined shape and optical properties relative to said code pattern, wherein said target includes a portion proximate to said periphery, wherein said target has approximately radial features distinct from said plurality of data cells, and wherein a centroid of said target is adjacent to a centroid of said enclosed code area.

58. The method of claim 57, wherein a preferred rotational orientation of said code pattern is not evident.

59. The method of claim 57, wherein applying said code pattern and applying said target are accomplished in one operation.

60. The method of claim 57, wherein said converting includes encrypting said information.

61. The method of claim 57, wherein said converting includes the use of an error correction algorithm.

62. The method of claim 57, further comprising applying a quality pattern having predetermined shapes and optical properties relative to said code pattern.

63. The method of claim 57, wherein a distance between any two points of said target is within 15% of the distance between corresponding points of said predetermined target.

64. The method of claim 57, wherein said converting comprising converting said information into a binary number, wherein said code pattern comprising a plurality of data cells, individual ones of said plurality of data cells having predetermined shapes and locations within said code image, wherein said two or more optical properties is two optical properties, where each of said two optical properties corresponds to one of the two binary digits, and wherein each of said plurality of data cells corresponds to a bit of said binary number.

65. The method of claim 64, wherein said converting includes use of an error correction algorithm, such that said information is stored in less than a total number of said plurality of data cells.

66. The method of claim 65, wherein said information is a 64-bit number, wherein said converting converts said information into a 114-bit number, said error correction algorithm further comprising:
 adding two additional binary digits to said 64-bit number to form a 66-bit number; grouping said 66 bits into 11, 6-bit symbols; and
 encoding said 11, 6-bit symbols with a Reed-Solomon (19,11) algorithm to obtain a 114-bit digit number.

67. An optical code formed on a surface of a substrate, comprising:
 a perimeter defining an outer extent of the code,
 at least one cluster within the perimeter of a plurality of data cells that adjoin one another in a two-dimensional pattern, individual ones of the plurality of data cells having a predetermined shape and one of at least first and second optical properties according to data being stored therein, and wherein none of the plurality of data cells having the first optical property are totally surrounded by others of the plurality of data cells having the same first optical property, and
 a plurality of target elements within the perimeter and having one of said at least first and second optical properties, a fixed spatial relationship with said at least one cluster of a plurality of data cells and which contain no data.

68. The code of claim 67, wherein the substrate surface is of a first color, the first optical property is a second color that is optically distinguishable from the first color and the second optical property is the first color of the substrate surface.

69. The code of claim 68, wherein the plurality of target elements are of the second color.

70. The code of claim 69, wherein the second color is a dark color.

71. The code of claim 70, wherein the first color of the substrate surface is a light color.

72. The code of claim 67, wherein the predetermined shape of the data cells is a hexagon and the plurality of data cells adjoin one another by sharing edges of the hexagon shape.

73. The code of claim 67, wherein said perimeter is in the shape of an ellipse.

74. The code of claim 73, wherein the ellipse is a circle.

75. The code of claim 73, wherein the plurality of target elements include a plurality of areas that are elongated generally in a radial direction.

76. The code of claim 67, wherein said at least one cluster of a plurality of data cells includes exactly three clusters of such cells.

77. The code of claim 67, wherein the characteristic of none of the plurality of data cells having the first optical property being totally surrounded by others of the plurality of data cells having the same first optical property is accomplished by not using as data cells a plurality of non-cell areas within said at least one cluster that individually have said predetermined shape and said second optical property.

78. The code of claim 77, wherein said predetermined shape is a hexagon and the plurality of data cells and non-cell areas adjoin one another by sharing edges of the hexagon shape.

79. The code of claim 77, wherein said perimeter is in the shape of an ellipse.

80. The code of claim 79, wherein the ellipse is a circle.

81. The code of claim 77, wherein the plurality of target elements include a plurality of areas that are elongated generally in a radial direction.

82. An optical code formed on a surface of a substrate, comprising:
 a perimeter defining an outer extent of the code,
 a plurality of two-dimensional clusters of data cells spaced apart within the perimeter, the individual clusters including a plurality of hexagon shaped data cells adjoining one another, individual ones of the plurality of data cells either being printed or not-printed in accordance with a bit of data being stored therein, and wherein hexagon shaped areas within the clusters are not used as data cells so that none of the plurality of data cells that are printed can be surrounded by others of the plurality of data cells that are also printed, and
 a plurality of target elements within the perimeter that are printed and have a fixed spatial relationship with the plurality of clusters of data cells.

83. The code of claim 82, wherein said perimeter is in the shape of an ellipse.

84. The code of claim 83, wherein the ellipse is a circle.

85. The code of claim 82, wherein the plurality of target elements include a plurality of areas that are elongated generally in a radial direction.

86. The code of claim 82, wherein said plurality of clusters of a plurality of data cells includes exactly three clusters of such cells.

87. The code of claim 84, wherein the plurality of target elements include a plurality of areas containing visible radially extending elements positioned to allow determination of a rotational orientation of the plurality clusters of data cells.

88. An optical code formed on a surface of a substrate, comprising:

a perimeter defining an outer extent of the code, at least one cluster within the perimeter of a plurality of data cells that adjoin one another in a two-dimensional pattern, individual ones of the plurality of data cells having a predetermined shape and one of at least first and second optical properties according to at least one bit of data being stored therein, wherein each of a plurality of data symbols adapted for use by a Forward Error Correction Algorithm are formed from a given number of bits of data encoded in order in a contiguous series of adjoining data cells, and a plurality of target elements within the perimeter and having one of said at least first and second optical properties and a fixed spatial relationship with said at least one cluster of a plurality of data cells.

89. The code of claim 88, wherein said cluster additionally includes therein a plurality of non-data storage areas that individually have said predetermined shape.

* * * * *

UNITED STATES PATENT AND TRADEMARK OFFICE
CERTIFICATE OF CORRECTION

PATENT NO. : 6,601,772 B1
DATED : August 5, 2003
INVENTOR(S) : Kim T. Rubin, Keith Blei and John R. Haggis It is certified that error appears in the above-identified patent and that said Letters Patent is hereby corrected as shown below:

<u>Title page,</u>
Item [56], References Cited, U.S. PATENT DOCUMENTS, please insert the following omited references:

| | | |
|---|---|---|
| -- 3,513,320 | 5/1970 | Weldon |
| 3,553,438 | 1/1971 | Blitz et al. |
| 3,801,775 | 4/1974 | Acker |
| 3,916,160 | 10/1975 | Russo et al. |
| 3,971,917 | 7/1976 | Maddox et al. |
| 4,831,610 | 5/1989 | Hoda et al. |
| 4,896,029 | 1/1990 | Chandler et al. |
| 4,855,725 | 8/1989 | Fernandez |
| 4,939,354 | 7/1990 | Priddy et al. |
| 5,053,609 | 10/1991 | Priddy et al. |
| 5,124,536 | 6/1992 | Priddy et al. |
| 5,818,032 | 10/1998 | Sun et al. |
| 6,052,813 | 4/2000 | Nagasaki et al. |
| 6,058,498 | 5/2000 | Nagasaki et al. -- |

FOREIGN PATENT DOCUMENTS,
-- WO 99/36876 7/1999
 WO 00/07356 2/2000 --

OTHER PUBLICATIONS,
-- Otsu, Nobuyuki, "A Threshold Selection Method from Gray-Level Histograms," IEEE Transactions on Systems, Man, and Cybernetics, Vol. SMC-9, No. 1 Jan. 1979.
Internet Article entitled: "Information on 2-D or Two-Dimensional Bar Codes," 10 Pages, Dec. 2, 1999,
wysiwyg://116/http://www.geocities.com/WallStreet/9724/uk2dinfo.htm
Internet Article entitled: "Applicational Potentiality of PDF417 Bar Code," 6 Pages, Dec. 2, 1999, wysiwyg://118/http://www.geocities.com/WallStreet/9724/ukpdfdoc.htm --

UNITED STATES PATENT AND TRADEMARK OFFICE
CERTIFICATE OF CORRECTION

PATENT NO.    : 6,601,772 B1
DATED         : August 5, 2003
INVENTOR(S)   : Kim T. Rubin, Keith Blei and John R. Haggis It is certified that error appears in the above-identified patent and that said Letters Patent is hereby corrected as shown below:

Column 17,
Line 53, after "precise rotational error.", please delete "Combine the".
Line 54, before "scores from the four", please insert -- Combine the --.

Column 22,
Line 5, after "first" and before "perimeters", please insert -- target --.

Column 24,
Line 3, after "The code of claim", please delete "43" and insert -- 44 --.

Signed and Sealed this

Sixteenth Day of December, 2003

JAMES E. ROGAN
*Director of the United States Patent and Trademark Office*